United States Patent Office 3,337,390
Patented Aug. 22, 1967

3,337,390
LAMINATED FOAM POLYMER AND METHOD OF MANUFACTURE
Frank L. Saunders, Midland, Mich., assignor to The Dow Chemical Company, Midland, Mich., a corporation of Delaware
No Drawing. Filed June 6, 1963, Ser. No. 285,882
4 Claims. (Cl. 161—160)

This invention relates to foamed polymers having a tough, impervious protective coating and the method for producing them. More particularly, it concerns isotactic foamed polymers which are coated directly without first pretreating the polymer surface to prevent damage to the cellular structure by the coating material.

Foamed resins such as polystyrene are useful in the manufacture of molded buoyant articles such as floats, life preservers, and the like as well as thermally insulated items such as ice chests, beverage containers, building panels, etc. Although these foams are rigid, they have little resistance to punctures owing to the thin, brittle walls of the foam cells. Therefore, polystyrene foam ordinarily is coated with a tough, impervious layer of a material such as a polyester resin to produce a more durable product. It is desirable that the protective layer bond tightly to the surface of the foam for maximum strength in the coated article. Special techniques are required to apply the coating so that the solvent action of the coating material does not destroy the cellular structure of the foam along the interface between the coating and the foam. One method which has been used is to coat the foam with a protective layer of a material which does not affect the foam then apply the polyester coating to the protective layer. Another method involves foaming the polystyrene in contact with the layer of polyester as the ester is being polymerized. In laminates prepared by one of these methods, the protective layer is attached to the foam by the slight penetration of the polyester into the foam without any significant destruction of the cellular structure.

According to this invention, a laminated foam of an alkenyl aromatic resin can be prepared from prefoamed resin without the necessity for pretreating the surface to prevent damage to the cellular structure. The laminate is prepared by coating a foamed crystalline isotactic polymer directly with a settable composition such as a mixture of a polyester resin and a vinyl monomer. A small concentration of a catalyst mixed with the coating materials promotes the polymerization of the monomer and the polyester to produce the tough, impervious layer. Isotactic polystyrene undergoes substantial crystallization when it is foamed, giving it the unusual property of being substantially insoluble in the unpolymerized coating materials so that surface preparation is unnecessary. By applying the polymerized coating material directly to the foam a particularly good bond is obtained owing to the limited diffusion of the monomer into the foam and its subsequent polymerization therein. In addition to the greater solvent resistance of the foamed crystalline isotactic polymer it also has a higher heat distortion temperature than the foamed atactic polymer which makes it possible to cure the coated foam more rapidly at a higher temperature.

This invention may be illustrated by referring to the following examples describing a laminate which was prepared in accordance therewith.

*Example 1*

Equal parts of polyester resin and styrene monomer were combined with 0.01 part of benzoyl peroxide. A layer of this material about 1/16 inch deep was placed in a tray then a glass fiber mat was placed in the mixture and saturated with it. A plug of foamed crystalline isotactic polystyrene was then placed on the surface of the resin layer and the resin cured at 75° C. for 20 hours. When cooled to ambient temperature, the resulting laminate had a strong bond between the foam and the polyester resin with no apparent collapse in the foam structure. The polyester resin used in this experiment contained 0.7 mole of phthalic anhydride and 0.3 mole fumaric acid per mole of propylene glycol.

*Example 2*

Foamed beads of crystalline isotactic polystyrene having a diameter of about 1/4 inch were placed in a solution of polyester resin dissolved in styrene and containing benzoyl peroxide as described in Example 1. This mixture was cured at 75° C. for 12 hours to produce a low density resinous body. Here again, there appeared to be no collapse in the foam structure at the polyester-foam interface.

The thickness of the coating on the foamed body is not critical and may be designed to fit the needs of the particular item being made. Wall panels, for example, require a coating from about 1/16 to about 1/4 inch thick to resist damage by sudden impact. On the other hand, a lightweight beverage container may have a coating less than 1/16 inch thick since the principal function of the coating is to produce a smooth surface which is easily cleaned. The strength of the coating can be anhanced substantially by placing a mat of a fibrous material in the coating resin as described above in Example 1.

To provide the greatest protection for the fragile cellular structure it is desirable that the coating be tough and quite rigid without being brittle; therefore, the type of polymer structure produced by the polymerization of styrene with a polyester is particularly suitable. These resins not only have excellent bonding properties both with the foamed resin and with fibrous reinforcing materials such as glass fibers but they do not liberate water, solvent, or other material which would produce a change in volume during the setting of the resin. The polyester resins, also referred to as alkyds, are a viscous, partially polymerized or esterified mixture of an olefinically unsaturated dicarboxylic acid and a polyhydric alcohol. Suitable acids include phthalic acid and its isomers, adipic acid, maleic acid, fumaric acid, itaconic acid, and citraconic acid. Examples of polyhydric alcohols which may be used are ethylene glycol, propylene glycol, butylene glycol, octylene glycol, polyethylene glycol, and polypropylene glycol. The polyester resin is dissolved in an olefinically reactive monomer such as styrene, ortho-vinyl toluene, vinyl toluene, ortho-chlorostyrene, and methyl methacrylate along with a polymerization initiator such as benzoyl peroxide so that the coating cures or solidifies at a suitable rate at the elevated curing temperature.

Polymeric materials other than the polyesters which cure to a tough, impervious coating may be used with the crystalline foams according to this invention. Another suitable material is the plastisol type of resin. A resin of this type which has worked well in coating plastic foam is one containing approximately equal parts by weight of polyvinyl chloride and monomeric chlorostyrene along with approximately two weight percent ethylenedimethacrylate and about one percent dicumyl peroxide as a polymerization initiator. Plastisols of this type are paste-like masses which can be spread on the foam then heated to produce the tough coating. An isotactic foam coated with a plastisol is illustrated in Example 3.

Example 3

A plastisol containing about 50 parts by weight of high molecular weight polyvinyl chloride powder having a particle diameter in the range 0.5–2 microns and about 48 parts by weight of a mixture of o- and p-isomers of chlorostyrene were combined with two parts by weight of ethylenedimethacrylate and 0.5 part dicumyl peroxide. This material was spread on the face of a plug of isotactic polystyrene foam then the plug heated at a temperature in the range from about 70° to 80° C. The polyvinyl chloride became plasticized by the chlorostyrene at that temperature level. Upon further increase in the temperature to about 140° C. the dicumyl peroxide initiated the polymerization of the chlorostyrene and polyvinyl chloride. After maintaining this temperature level for about six minutes the plug was allowed to cool to ambient room temperature whereupon the coating solidified to produce the tough, impervious layer.

Although this invention has been described with specific reference to crystalline isotactice polystyrene foam, it should be understood that the invention is applicable to foamed crystalline isotactic polymers and copolymers of other alkenyl aromatics such as α-methyl styrene, ethyl styrene, isopropyl styrene, chlorostyrene, vinyl toluene, and vinyl xylene. The isotactic foams of these polymers may be prepared by polymerizing the monomer in the presence of a Ziegler type catalyst such as aluminum triethyl and titanium chloride. The polymer obtained in this manner is melted and quenched to produce the amorphous form which is most easily foamed. The blowing agent is incorporated into the amorphous polymer and the foam then produced in the conventional manner of producing foams by heating the polymer containing the blowing agent. The foam is generated at a temperature in the range from 150° to 190° C. which is somewhat higher than ordinarily used for atactic polymers. At this temperature the isotactic polymer crystallizes to the extent of about 10–15 percent, thereby rendering it substantially insensitive to the solubilizing action of the coating materials. A higher degree of crystallinity may be obtained by annealing the foamed polymer at a temperature approximately 50° C. below the crystalline melting point.

I claim.

1. The method of coating crystalline isotactic polystyrene foam directly with a plastisol comprising:
   depositing directly on said foam a layer of a plastisol containing approximately equal parts of polyvinyl chloride and chlorostyrene together with about 2 to 4 weight percent ethylenedimethacrylate and 0.5 to 1 weight percent dicumyl peroxide,
   heating said coated foam to a temperature in the range from 130° to 150° C. for a period of about 2 to 10 minutes, then
   allowing said coating to cool to ambient temperature.

2. A method of producing a crystalline isotactic foamed polystyrene member having a tough, impervious coating thereon comprising:
   quenching a fused isotactic styrene polymer,
   incorporating a blowing agent in said quenched polymer,
   then foaming said polymer at a temperature in the range from 150° to 190° C.,
   coating said foamed polymer directly with a polymerizable solution of a polyester resin dissolved in an alkenyl aromatic monomer together with a polymerization catalyst, said polyester resin and alkenyl aromatic monomer being present in approximately equal amounts, then
   heating said coating to a temperature in the range from 75° to 125° C. to effect the polymerization thereof.

3. A laminated product comprising a crystalline isotactic foam of an alkenyl aromatic polymer having a tough, impervious coating bonded directly thereto, said coating being a polymer produced by thermally curing approximately equal parts by weight of polyvinyl chloride and monomeric chlorostyrene in the presence of 2 to 4 weight percent ethylenedimethacrylate and 0.5 to 1 weight percent dicumyl peroxide.

4. The laminated product of claim 3 wherein said alkenyl aromatic polymer is polystyrene.

References Cited

UNITED STATES PATENTS

| | | | |
|---|---|---|---|
| 2,851,379 | 9/1958 | Staudinger et al. | 156—332 |
| 2,861,910 | 11/1959 | Johnston et al. | 156—332 |
| 2,894,932 | 7/1959 | Bader et al. | 156—332 X |
| 2,928,456 | 3/1960 | Potchen et al. | 161—160 |
| 2,958,686 | 11/1960 | Dunham et al. | 161—231 |
| 3,207,645 | 9/1965 | Collardeau et al. | 161—231 |

OTHER REFERENCES

Natta et al.: J. Am. Chem. Soc., vol. 77, pp. 1708–10, Mar. 20, 1955, Crystalline High Polymers of α-Olefins. Note particularly the second column, p. 1708, second full paragraph and "crystalline polystyrene," Table I, and the "Isotactic" footnote (6).

Natta et al.: Jour. of Polymer Science, vol. 24, No. 106, April 1957, pp. 161–172. Note particularly p. 171, next to last paragraph, TP 156 C–35N37.

Page 123, Symposium, Chicago, Sept. 5–6, 1961, Advances in Chemistry, No. 34, A.C.S., Washington, D.C., 1962.

Skeist, I.: Handbook of Adhesives, pp. 486, 491 (next to last paragraph), 1962.

EARL M. BERGERT, *Primary Examiner.*

C. B. COSBY, *Assistant Examiner.*